United States Patent [19]

Bridges

[11] Patent Number: 4,493,547
[45] Date of Patent: Jan. 15, 1985

[54] DATA RECORDING PHOTOGRAPHIC CAMERA

[75] Inventor: Mark E. Bridges, Spencerport, N.Y.

[73] Assignee: Eastman Kodak Company, Rochester, N.Y.

[21] Appl. No.: 565,317

[22] Filed: Dec. 27, 1983

[51] Int. Cl.$^3$ .............................................. G03B 17/24
[52] U.S. Cl. ................................... 354/424; 354/106; 354/129
[58] Field of Search ............... 354/410, 413, 424, 105, 354/106, 107, 109, 129

[56] References Cited

U.S. PATENT DOCUMENTS

| | | | |
|---|---|---|---|
| 3,552,283 | 1/1971 | Babcock et al. | 95/1.1 |
| 3,675,549 | 7/1972 | Adain | 354/105 |
| 3,889,281 | 6/1975 | Taguchi | 354/109 |
| 4,085,412 | 4/1978 | Yoshino | 354/106 |
| 4,123,767 | 10/1978 | Halpern | 354/107 |
| 4,179,203 | 12/1979 | Hirohata | 354/106 |
| 4,183,645 | 1/1980 | Ohmura | 354/106 |
| 4,199,242 | 4/1980 | Hosomizu et al. | 354/105 |
| 4,362,369 | 12/1982 | Kazami et al. | 354/105 |
| 4,444,479 | 4/1984 | Johnson et al. | 354/413 |

Primary Examiner—Russell E. Adams
Attorney, Agent, or Firm—Roger A. Fields

[57] ABSTRACT

A data recording camera, which records information on unexposed film concomitant to taking a picture, uses a light source to record the information and for initiating a camera operation related to picture taking, such as firing an electronic flash. A photoelectric sensor in the camera, for example a phototransistor or a photodiode, responds to incident light from the light source and to the discontinuation of such light by undergoing respective electrical changes. A triggering element connected to the photoelectric sensor initiates the camera operation in response to the photoelectric sensor undergoing a particular one of its electrical changes. In the example of an electronic flash, a silicon controlled rectifier (SCR) is connected to the photoelectric sensor. The SCR renders the flash circuit conductive, to fire a flash tube in synchronization with opening of the camera shutter, in response to the photoelectric sensor undergoing an electrical change after the shutter uncovers the light source.

5 Claims, 3 Drawing Figures

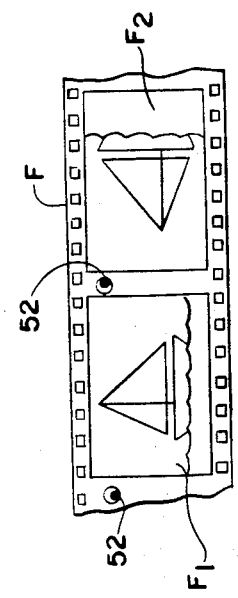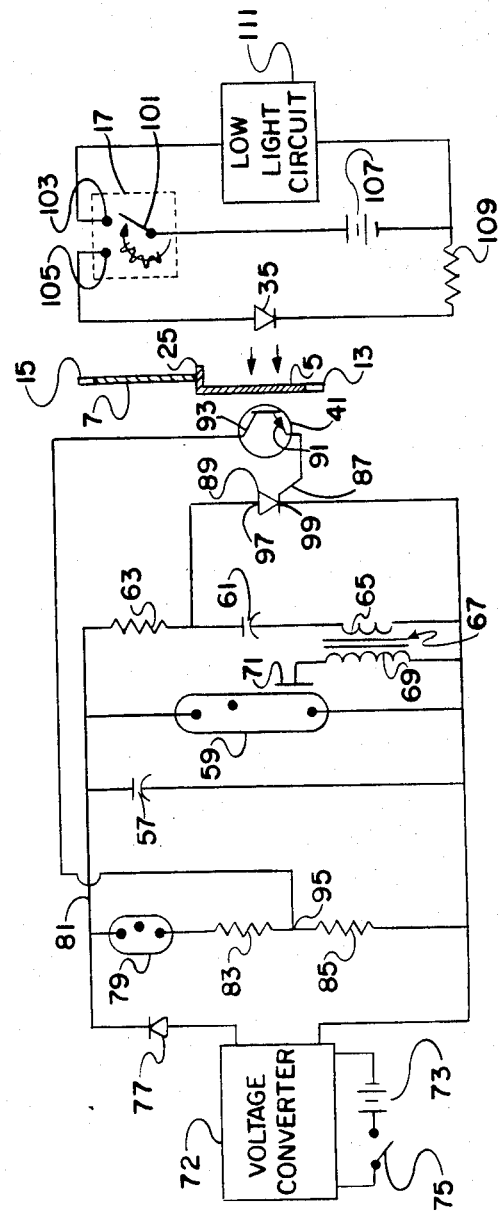

DATA RECORDING PHOTOGRAPHIC CAMERA

BACKGROUND OF THE INVENTION

1. Field of the Invention

The invention relates to photographic cameras which, concomitant to photographing a subject, record information on the film, such as the data or the time, the exposure parameters, the orientation (i.e., horizontal or vertical) of the camera, or some other data connected with photographing the subject.

2. Description of the Prior Art

Photographic cameras which can record information in or adjacent a film frame substantially simultaneously with picture taking are well known in the conventional camera art. Typically, in such a camera, a data source is provided for displaying information generally relating to photographing a subject. The data source may be manually or automatically adjusted to change the displayed information. A light source, such as an incandescent lamp or a light emitting diode, which may be part of or separate from the data source, is energized to illuminate the information, usually in response to depressing a shutter release. Some optical means, such as a fiber optic light guide, is provided to form an illuminated image of the information in or adjacent a film frame, to record such information on the unexposed film.

Various types of information may be recorded on the film. For example, in U.S. Pat. Nos. 3,552,283 and 4,183,645, respective indicia are provided to identify whether the camera was disposed horizontally or vertically during picture taking. Other types of information that may be recorded on the film include the picture taking date, as in U.S. Pat. Nos. 4,085,412 and 4,179,203, the exposure parameters, a unique number which identifies the camera used, as in U.S. Pat. No. 4,123,767, etc.

An obvious problem that exists in cameras which have a data recording device is that the inclusion of such a device in a camera increases the manufacturing cost and the complexity of the camera. Until my invention, as far as I am aware of the prior art, there has not been a data recording camera in which its data recording means, in addition to being used for data recording purposes, is used to effect some other camera operation, for example initiating the firing of an electronic flash. Such an improvement to a data recording camera lessens its manufacturing cost and its complexity by eliminating otherwise used camera elements for effecting the other camera operation.

SUMMARY OF THE INVENTION

My invention simplifies so-called data recording cameras of the type having (a) a data source for providing information relating to photographing a subject, (b) a light source for illuminating such information, and (c) means for forming an illuminated image of the information on unexposed film in the camera to record the information on the film, by providing the improvement comprising:

a photoelectric sensor, responsive to incident light and to the discontinuation of such light, for undergoing respective electrical changes;

means for directing light from the light source onto the photoelectric sensor to cause the sensor to undergo one of its electrical changes;

means for discontinuing light from the light source to the photoelectric sensor to cause the sensor to undergo its other electrical change; and means, responsive to the photoelectric sensor undergoing a particular one of the electrical changes, for generating a triggering signal to effect a camera operation related to photographing a subject.

In a preferred embodiment of the invention, optical means define respective light paths, which have a common light inlet proximate the light source, and which diverge in one direction toward unexposed film in the camera and in another direction toward the photoelectric sensor. A shutter, movable to initiate and terminate a film exposure to photograph a subject, includes an integral light blocking member normally located between the light source and the light inlet. When the shutter is moved to initiate a film exposure, the light blocking member moves from between the light source and the light inlet, permitting information to be recorded on the film and light to be directed onto the photoelectric sensor. An electronic flash circuit for firing a flash tube substantially in synchronization with full opening of the shutter includes a silicon controlled rectifier (SCR) connected to the photoelectric sensor. The SCR renders the flash circuit conductive, to fire the flash tube, in response to the photoelectric sensor undergoing the electrical change induced by incident light from the light source.

Accordingly, in the preferred embodiment, the invention simplifies a data recording camera having flash capability by using the light source in the data recording device for two purposes. That is, to record information on the film concomitant to photographing a subject, and for initiating flash firing substantially in synchronization with full opening of the shutter.

In a variation of the preferred embodiment, the light blocking member integral with the shutter is normally removed from between the light source and the light inlet. When the shutter is moved to initiate a film exposure, the light blocking member moves between the light source and the light inlet, discontinuing incident light to the photoelectric sensor. A known inverter circuit, connecting the photoelectric sensor and the SCR, causes the SCR to render the flash circuit conductive in response to the photoelectric sensor undergoing the electrical change induced by the discontinuation of incident light from the light source.

BRIEF DESCRIPTION OF THE DRAWINGS

The invention will be described with respect to the drawings, wherein:

FIG. 2 is a plan view of a longitudinal section of exposed film, illustrating indicia recorded adjacent each film frame to identify whether the camera was held horizontally or vertically during picture taking; and FIG. 3 is a schematic diagram illustrating an electrical circuit for effecting flash firing in the camera.

DESCRIPTION OF THE PREFERRED EMBODIMENT

Figure 1:
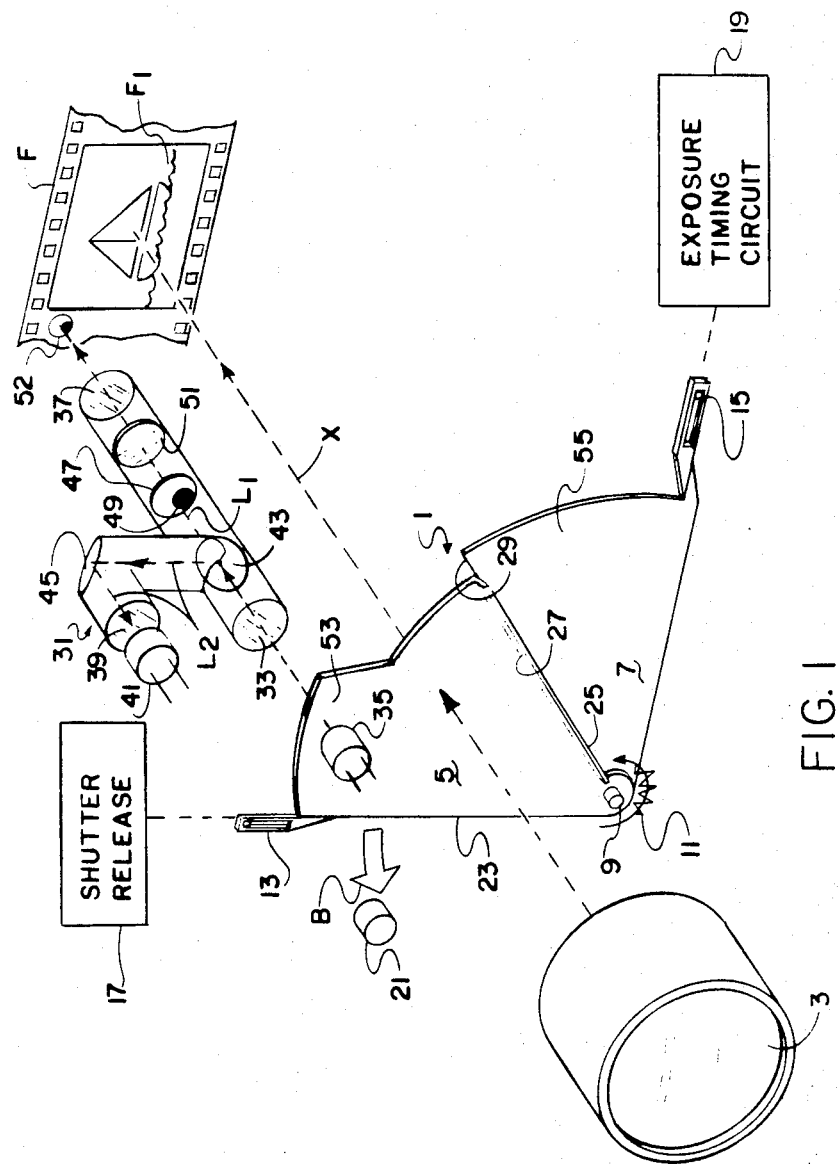
FIG. 1 is an exploded perspective view of a data recording camera, which records information on unexposed film concomitant to photographing a subject, and uses a light source to record the information and for initiating a conventional operation in the camera, such as firing an electronic flash, in accordance with a preferred embodiment of the invention.

The invention is described as being embodied in a still picture camera having an integral electronic flash unit. Because such flash cameras are well known, this description will be directed in particular to apparatus forming part of or cooperating directly with the preferred embodiment. It is to be understood, however, that camera elements not specifically shown or described may take various forms known to persons of ordinary skill in the camera art.

Referring now to the drawings, a camera shutter 1 is shown in FIG. 1 in a cocked position preparatory to actuation for effecting a film exposure to photograph a subject. Actuation of the shutter 1 allows ambient or flash light, reflected from the subject, to be directed by a picture taking lens assembly 3 along an optical axis X of the lens assembly and onto an unexposed section of a filmstrip F. The shutter 1 includes a pair of opaque blades 5 and 7 which are pivotally mounted on a pivot pin 9 for separate movement by a spring device 11 across the optical axis X, in the direction indicated by an arrow B. Respective latches 13 and 15 retain the two blades 5 and 7 in their cocked positions, as shown in FIG. 1. In order to actuate the shutter 1 to effect a film exposure, a conventional shutter release 17 connected to the latch 13 is fully depressed, which retracts the latch from the blade 5. This frees the blade 5 for movement away from the blade 7 in the direction B, opening the shutter 1 to uncover the lens assembly 3 and thereby initiate a film exposure. After the elapse of an appropriate exposure time, a conventional exposure timing circuit 19, which is closed in response to opening movement of the blade 5, causes the latch 15 to be retracted from the blade 7. This releases the blade 7 for movement toward the blade 5 in the direction B, closing the shutter 1 to again cover the lens assembly 3 and thereby terminate the film exposure.

As shown in FIG. 1, a fixed stop 21 is spaced from the blade 5, but is disposed in the way of a leading edge 23 of such blade to halt opening movement of the blade. Similarly, a right-angled tab 25 on a trailing edge 27 of the blade 5 is disposed in the way of a leading edge 29 of the blade 7 to halt closing movement of the blade 7 after the blade 5 is stopped.

While not shown, the basic components of the exposure timing circuit 19 are typically a capacitor and a photo conductor. The photo conductor is disposed to receive ambient light reflected from the subject to be photographed and has a resistance that varies in inverse proportion to the intensity of such incident light. When the timing circuit 19 is closed in response to opening movement of the blade 5, the capacitor begins to charge at a rate inversely proportional to the product of its capacitance and the resistance of the photo conductor. Charging of the capacitor to a particular level energizes a device, such as an electromagnet connected to the latch 15, to retract the latch from the blade 7, permitting the blade to start its closing movement. If the light intensity falling on the photo conductor is high, the charging period of the capacitor—and hence the interval between shutter opening and shutter closing—is comparatively short. In low light, however, the resistance of the photo conductor increases and the capacitor takes longer to charge, which leads to a longer exposure time.

A data recording device for recording information on the filmstrip F concomitant to photographing a subject includes light transmission means, preferably a transparent plastic light pipe 31, shown in FIG. 1. The light pipe 31 has a light inlet 33 spaced opposite a low intensity light source, such as a light emitting diode (LED) 35, and respective light outlets 37 and 39 adjecent the filmstrip F and photoelectric sensor means, such as a phototransistor 41. The phototransistor 41 is a typical optoelectronic semiconductor in that it undergoes respective electrical changes (e.g., turns on, turns off) in response to incident light from the LED 35 and to the discontinut_ion of such light. A half-mirror 43, i.e., a beam splitter, located within the light pipe 31, divides the light rays from the LED 35 between two light paths $L_1$ and $L_2$. One of the light paths $L_1$ is for light rays passing through the half-mirror 43 to the light outlet 37. The other light path $L_2$ is for light rays first reflected from the half-mirror 43 to a full mirror 45, located within the light pipe 31, and then reflected to the light outlet 39. A data source for providing information relating to photographing a subject preferably is a transparent sealed chamber 47, located within the light pipe 31 across the light path $L_1$, and an opaque disc 49, which is free to roll inside the sealed chamber, under the influence of gravity, to respective positions corresponding to horizontal and vertical orientations of the camera during picture taking. A focusing lens 51 is located within the light pipe 31 between the sealed chamber 47 and the light outlet 37 for focusing an image of a light dot 52, partially obscured by the disc 49, on an unexposed portion of the filmstrip F adjacent a film frame $F_1$, as shown in FIG. 1. Low intensity light for forming the light dot 52 is provided by the LED 35.

In order to completely understand how the data source is utilized to indicate the horizontal or vertical orientation of the camera during picture taking, a study should be made of FIG. 2. FIG. 2 shows two successive film frames $F_1$ and $F_2$ and two focused images of the light dot 52, partially obscured by the disc 49. The disc 49 is in respective positions corresponding to horizontal and vertical orientations of the camera during picture taking.

As shown in FIG. 1, the opening blade 5 includes a light blocking sector 53 located between the LED 35 and the light inlet 33 of the light pipe 31. When the blade 5 is moved away from the blade 7 in the direction B, to open the shutter 1 and thereby initiate a film exposure, the light blocking sector 53 moves from between the LED 35 and the light inlet 33. This permits low intensity light from the LED 35 to form a focused image of the light dot 52, partially obscured by the disc 49, on the filmstrip F and permits such light to be directed onto the phototransistor 41, to turn the phototransistor on. Such latter purpose, involving the phototransistor, will become apparent below in connection with a detailed description of an electronic flash circuit. The closing blade 7 includes an integral light blocking sector 55 which, in FIG. 1, is shown removed from between the LED 35 and the light inlet 33. When, after the elapse of an appropriate exposure time, the blade 7 is moved toward the blade 5 in the direction B, to close the shutter and thereby terminate the film exposure, the light blocking sector 55 moves between the LED 35 and the light inlet 33 to discontinue light from the LED to the filmstrip F and the phototransistor 41.

FIG. 3 shows a conventional electronic flash circuit connected to the phototransistor 41. Such a circuit, which is similar to the ones disclosed in U.S. Pat. Nos. 3,846,812 and 3,969,737, includes a firing capacitor 57 connected in parallel across an electronic flash tube 59 to provide the firing voltage for igniting the flash tube. A trigger capacitor 61 of relatively small capacitance, a resistor 63, and one terminal of the low voltage primary winding 65 of a pulse transformer 67 are connected in series with one another and in parallel across the flash tube 59. As is customary, one terminal of the high voltage secondary winding 69 of the transformer 67 is connected in series with a trigger electrode 71, which may be a coil of wire wound round the outside of the flash tube 59.

A known voltage converter 72, which serves to convert the relatively low voltage of a battery 73 to a sufficient level for charging the firing capacitor 57 and the trigger capacitor 61, is connected to the flash circuit, as shown in FIG. 3. When a normally open on/off switch 75 is manually closed, the voltage converter 71 produces a high pulsating voltage which charges the capacitors 57 and 61 through a diode 77. The diode 77 prevents the flow of current in a reverse direction at times when the voltage converter 71 is below the potential of the firing capacitor 57.

A flash ready lamp 79 is connected between a lead 81, on which a positive voltage for charging the firing and trigger capacitors 57 and 61 appears, and a pair of resistors 83 and 85, disposed in series. The total resistance of the resistors 83 and 85 is selected to limit the current flowing through the ready lamp 79 to a suitable low value. The ratio of the resistors 83 and 85 is selected to provide a driving voltage across the resistor 85, when the ready lamp 19 is glowing, sufficient to supply gate current to the gate terminal 87 of a silicon controlled rectifier (SCR) 89. The gate current is supplied to the gate terminal 87 of the SCR 89 through the emitter 91 of the phototransistor 41, assuming the phototransistor is turned on by incident light from the LED 35 (uncovered by the opening blade 5). As shown in FIG. 3, the collector 93 of the phototransistor 41 is connected to the junction 95 between the resistors 83 and 85, and the SCR 89 is connected in parallel across the trigger capacitor 61 and the primary winding 65 of the pulse transformer 67. The SCR 89 is triggered into conduction by the gate current, which flows from its anode 97 to its cathode 99, causing the trigger capacitor 61 to abruptly discharge through the primary winding 65 of the pulse transformer 67. As this happens, a high voltage triggering pulse (e.g. 5000 volts) is applied to the trigger electrode 71 of the flash tube 59, which causes some of the gas in the tube to be ionized. Such ionization sharply reduces the inter-electrode resistance of the flash tube 59, allowing the firing capacitor 57 to rapidly discharge its energy through the tube, with the result that a very brief flash of high intensity light is produced almost instantly.

The shutter release 17, as shown in FIG. 3, includes a normally open control switch 101 having two contacts 103 and 105 which are individually closed when the shutter release is half depressed and fully depressed, respectively. As is typical, partially depressing the shutter release 17 to close the contact 103 does not unlatch the opening blade 5 of the shutter 1. The opening blade 5 is only unlatched upon fully depressing the shutter release 17. The contact 105 is connected in series with the LED 35, a battery 107, and a resistor 109, which limits current flowing to the LED to a suitable low value. The contact 103 is connected in series with the battery 107 and a conventional low light circuit 111, such as the one disclosed in U.S. Pat. No. 4,160,588. The low light circuit 111 is energized by partially depressing the shutter release 17 to close the contact 103, and causes an indicator lamp (not shown) to glow when ambient light reflected from the subject to be photographed is too low for an acceptable film exposure. Under those circumstances, the flash on/off switch 75 should be closed and the ready lamp 79 in the flash circuit should glow, before the shutter release 17 is fully depressed to close the contact 105 and to unlatch the opening blade 5. Closing the contact 105 causes the LED 35 to glow before the opening blade 5 can initiate a film exposure and uncover the LED 35.

Although not shown, appropriate electrical means connects the exposure timing circuit 19 and the electronic flash circuit to effect the same exposure time (e.g., 1/30 or 1/60 second) whenever the flash tube 59 is fired.

While the invention has been described with reference to a preferred embodiment, it will be understood that variations and modifications can be effected within the ordinary skill in the art without departing from the scope of the invention. For example, the light blocking sector 53 integral with the opening blade 5 of the shutter 1 may normally be removed from between the LED 35 and the light inlet 33 of the light pipe 31. When the blade 5 is moved to open the shutter 1 and thereby initiate a film exposure, the light blocking sector 53 moves between the LED 35 and the light inlet 33, discontinuing incident light to the phototransistor 41. In this example, a known inverter circuit, including a NOT gate, connects the emitter 91 of the phototransistor 41 and the gate terminal 87 of the SCR 89. The inverter circuit causes the SCR 89 to render the flash circuit conductive, when the flash on/off switch 75 is closed, in response to the phototransistor 41 being turned off by the discontinuation of incident light from the LED 35.

The shutter 1 is shown as a double-bladed type; however, it will be appreciated that a single blade rebound shutter can serve equally as well. Upon actuation by an impact member, such as a hammer, the single blade shutter would first move in a forward opening direction to uncover the lens assembly 3 and the LED 35, and then rebound off a stop member in a reverse closing direction to again cover the lens assembly and the LED.

The light source, i.e., the LED 35, and the data source, i.e., the opaque disc 49 in the transparent sealed chamber 47 are shown as separate elements; however, they may comprise a unitary device, such as in some pocket-type calculators, which use a plurality of LED's to display information in the form of numbers.

I claim:

1. In a photographic camera of the type having (a) a data source for providing information relating to photographing a subject, (b) a light source for illuminating such information, and (c) means for forming an illuminated image of the information on unexposed film in said camera to record the information on the film, the improvement comprising:

photoelectric sensor means, responsive to incident light and to the discontinuation of such light for undergoing respective electrical changes;

means for directing light from said light source onto said photoelectric sensor means to cause said sensor means to undergo one of the electrical changes;

means for discontinuing light from said light source to said photoelectric sensor means to cause said sensor means to undergo the other electrical change; and means, responsive to said photoelectric sensor means undergoing a particular one of the electrical changes, for generating a triggering signal to effect a camera operation related to photographing a subject.

2. The improvement as recited in claim 1, wherein said camera has a movable shutter for effecting a film exposure to photograph a subject, and said light discontinuing means includes light blocking means integral with said shutter for movement between said light source and said photoelectric sensor means.

3. The improvement as recited in claim 1, wherein said illuminated image forming means and said light directing means define respective light paths which have a common light inlet proximate said light source and which diverge in one direction toward a film in the camera and in another direction toward said photoelectric sensor means, and said light discontinuing means includes light blocking means movable between said light source and said light inlet.

4. In a photographic camera of the type having (a) a data source for providing information relating to photographing a subject, (b) a light source for illuminating such information, (c) means for forming an illuminated image of the information on unexposed film in said camera to record the information on the film, and (d) a shutter movable to effect a film exposure to photograph the subject, the improvement comprising:

photoelectric sensor means, responsive to incident light, for undergoing an electrical change;

means for directing light from said light source onto said photoelectric sensor means to cause said sensor means to undergo the electrical change;

light blocking means integral with said shutter, said light blocking means normally located between said light source and said photoelectric sensor means for preventing light from being directed onto said sensor means, though moving from between the two to permit light to be directed onto said sensor means as said shutter is moved to effect a film exposure; and means, responsive to said photoelectric sensor means undergoing the electrical change, for generating a triggering signal to initiate a camera operation related to the film exposure.

5. In a photographic camera of the type having (a) a data source for providing information relating to photographing a subject, (b) a light source for illuminating such information, (c) means for forming an illuminated image of the information on unexposed film in said camera to record the information on the film, (d) a shutter movable to initiate and terminate a film exposure to photograph the subject, and (e) an electronic flash unit fireable to illuminate the subject, the improvement comprising:

photoelectric sensor means, responsive to incident light, for undergoing an electrical change;

means for directing light from said light source onto said photoelectric sensor means to cause said sensor means to undergo the electrical change;

light blocking means integral with said shutter, said light blocking means normally located between said light source and said photoelectric sensor means for preventing light from being directed onto said sensor means, though moving from between the two to permit light to be directed onto said sensor means as said shutter is moved to initiate a film exposure; and means, responsive to said photoelectric sensor means undergoing the electrical change, for firing said flash unit.

* * * * *